United States Patent
Pathak et al.

(10) Patent No.: US 8,179,334 B2
(45) Date of Patent: May 15, 2012

(54) ELECTRICAL CONNECTOR WITH FREQUENCY-TUNED GROUNDPLANE

(75) Inventors: Vaneet Pathak, San Diego, CA (US); Gregory Poilasne, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 19 days.

(21) Appl. No.: 12/406,707

(22) Filed: Mar. 18, 2009

(65) Prior Publication Data

US 2009/0174505 A1  Jul. 9, 2009

Related U.S. Application Data

(62) Division of application No. 11/215,211, filed on Aug. 29, 2005, now Pat. No. 7,528,797.

(51) Int. Cl.
*H01Q 9/38* (2006.01)
*H01Q 1/36* (2006.01)
(52) U.S. Cl. ... 343/829; 343/702; 343/846; 343/700 MS
(58) Field of Classification Search ......... None
See application file for complete search history.

(56) References Cited

U.S. PATENT DOCUMENTS

| | | | |
|---|---|---|---|
| 5,300,899 A | | 4/1994 | Suski |
| 6,624,729 B2 | | 9/2003 | Wright et al. |
| 6,768,476 B2 | | 7/2004 | Lilly et al. |
| 7,009,567 B2 | * | 3/2006 | Iwai et al. ............ 343/702 |
| 7,071,888 B2 | | 7/2006 | Sievenpiper |
| 7,095,292 B2 | | 8/2006 | Sayanagi et al. |
| 7,276,992 B2 | | 10/2007 | Iwamoto et al. |
| 7,330,161 B2 | | 2/2008 | Matsugatani et al. |
| 7,482,982 B2 | * | 1/2009 | Jenwatanavet et al. ...... 343/702 |
| 7,511,671 B2 | * | 3/2009 | Oodachi ............ 343/702 |
| 7,525,494 B2 | * | 4/2009 | Tu et al. ............ 343/702 |
| 7,626,554 B2 | * | 12/2009 | Mashima et al. ............ 343/702 |
| 2002/0084876 A1 | | 7/2002 | Wright et al. |
| 2003/0112617 A1 | | 6/2003 | Ueno et al. |
| 2004/0066340 A1 | | 4/2004 | Hacker et al. |
| 2004/0222926 A1 | | 11/2004 | Kontogeorgakis et al. |
| 2007/0052596 A1 | * | 3/2007 | Liu et al. ............ 343/702 |

FOREIGN PATENT DOCUMENTS

| | | |
|---|---|---|
| EP | 1422787 | 5/2004 |
| GB | 2229322 | 9/1990 |
| GB | 2289167 | 11/1995 |
| JP | 2002-246822 | 8/2002 |
| WO | WO 97/44850 | 11/1997 |
| WO | WO 99/50929 | 10/1999 |

OTHER PUBLICATIONS

International Search Report (ISR): PCT/ISA/220, 210 for International applicaiton No. PCT/2006/032776, ISR dated Feb. 8, 2007, 7 pages.

* cited by examiner

*Primary Examiner* — Trinh Dinh

(57) ABSTRACT

An electrical connector with a frequency-tuned groundplane is disclosed. The connector includes a signal medium to communicate an electrical signal and a frequency-tuned groundplane medium to communicate a reference voltage (i.e., ground). The groundplane medium differentially supplies the reference voltage to the groundplane second end, responsive to the frequency of the electrical signal. In one aspect, the first groundplane layer conductive trace includes a transmission line pattern, and the second groundplane layer conductive trace is connected to the first groundplane layer conductive trace through a plurality of conductive vias. For example, the first groundplane layer may include a plurality of conductive patches, some of which have a via connection to the second groundplane layer conductive trace.

17 Claims, 4 Drawing Sheets

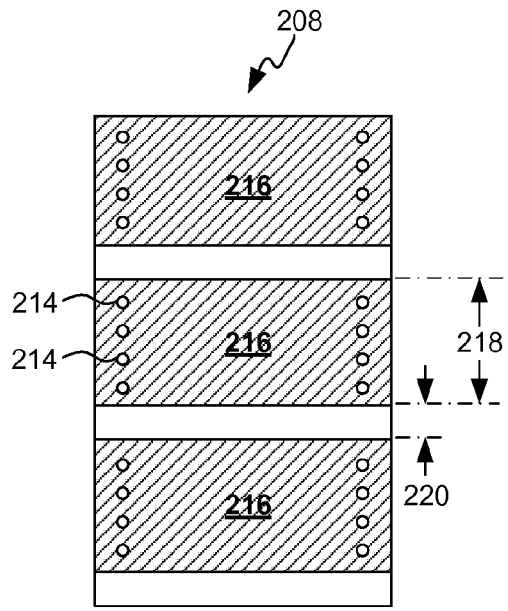
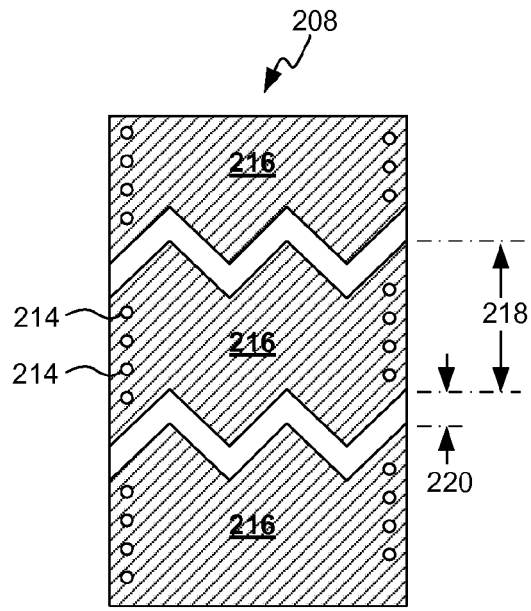
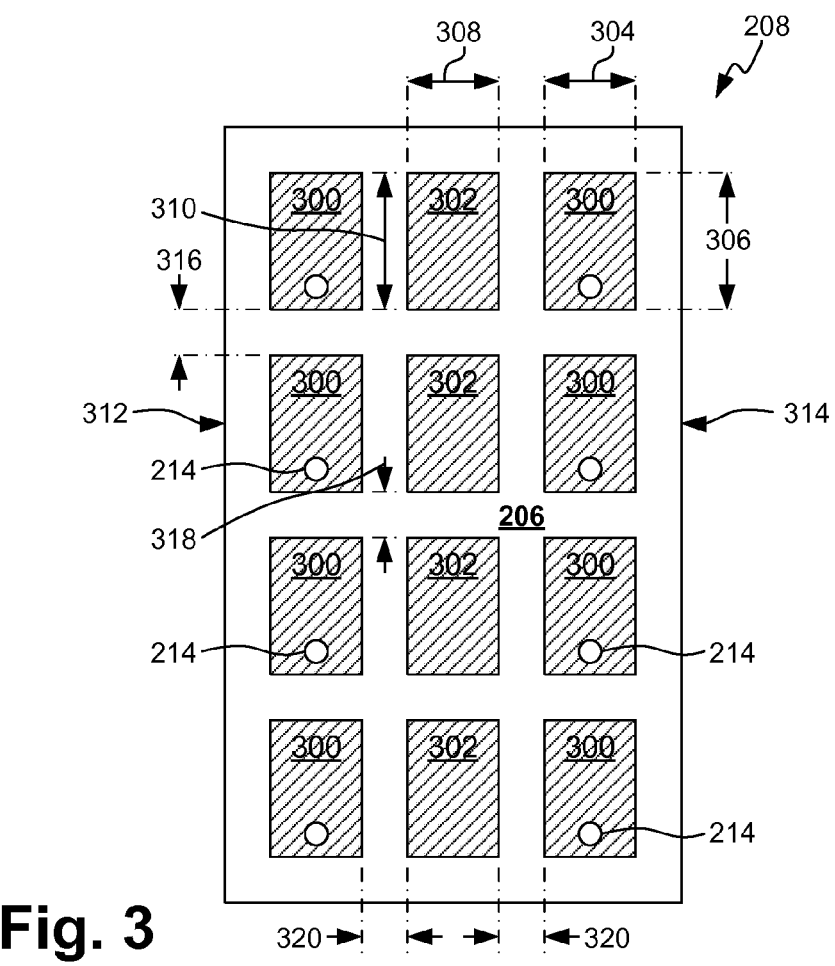

ELECTRICAL CONNECTOR WITH FREQUENCY-TUNED GROUNDPLANE

RELATED APPLICATIONS

This patent application is a divisional patent application of U.S. patent application Ser. No. 11/215,211, entitled "ELECTRICAL CONNECTOR WITH FREQUENCY-TUNED GROUNDPLANE" filed Aug. 29, 2005, now U.S. Pat. No. 7,528,797, and incorporated by reference in its entirety, herein.

FIELD

This invention generally relates to wireless communications and, more particularly, to a connector that is frequency-tuned to minimize the conduction of ground currents at particular selected radiation frequencies.

BACKGROUND

Consumers are demanding smaller and feature-rich wireless communication devices, such as cellular (cell) telephones. A smaller cell phone with more functions and features can be produced with two housing portions. One such configuration is a flip phone. A flip phone opens up like a clamshell. Other configurations are sliding phones and swivel phones. In a sliding phone, one portion of the cell phone housing slides relative to the other portion. In a swivel phone, one portion of the cell phone swivels open, relative to the other portion. A sliding phone is shown in U.S. application Ser. No. 10/931,712, filed on Sep. 1, 2004, by the instant assignees, the disclosure of which is incorporated herein by reference in its entirety.

Typically, one arrangement of the two housing portions is smaller than the other. The smaller arrangement is often called the closed configuration, and the larger arrangement is called the open configuration. The cell phone user can keep the cell phone in the closed configuration when carrying the cell phone, or for storage. In use, the cell phone is put in the open configuration. Some phones can be used in both configurations.

In some configurable cell phones, both housing portions have a groundplane. Groundplanes often act as the counterpoise for proximate antennas and almost always affect antenna performance. An antenna might perform optimally with the cell phone in one (i.e., open) configuration, but sub-optimally with the cell phone in the other (i.e., closed) configuration. The sub-optimal performance may be due to the positional change of one of the groundplanes relative to the antenna. An antenna that depends heavily on the groundplane, such as a patch antenna, planar inverted-F antenna (PIFA), or folded monopole, may perform poorly when a grounded metal is near the antenna in some configurations.

Poor antenna performance can be characterized by the amount of current unintentionally generated through a transceiving device, typically as surface currents, as opposed to the amount of energy radiated into the intended transmission medium (i.e., air). From the point of view of a transmitter, poor antenna performance can be measured as less radiated power, or less power in an intended direction. From the receiver perspective, poor antenna performance is associated with degraded sensitivity due to noisy grounds. From either point of view, poor performance can be associated with radio frequency (RF) ground currents.

The above-mentioned ground issues are compounded with the use of two-part clamshell type cell phones. Many cell phones use so-called flex films to carry signals between the two phone halves, for example, between a liquid crystal display (LCD) module and the main printed circuit board (PCB). These flex films are conventionally multi-layered planes of grounds and signal lines formed on, and separated by flexible sheets of dielectric insulator materials. These long thin signal wires may unintentionally act as antennas, interfering with the intended antennas and degrading the receiver performance. At the cost of connector flexibility, silver ink shielding (ground) layers can be used to cover the connector, or even added as internal layers. While this brute-force approach does shield the connector signal lines, other problems may be introduced. Since the shielded connector is located proximate to the antenna, the intended radiation patterns can be altered. Using a cell phone as an example, the shielded flex connector may cause a desired upward-pointing radiation pattern in the PCS band to point in an alternate, less desirable direction.

SUMMARY

The device described herein is a flexible connector with a groundplane that prevents current flow at particular radiation frequencies, between halves of a two-part wireless communications device. By controlling current flow between the device halves at the radiation frequencies, the ground geometry of the antenna can be made dependent upon the groundplane effects of the connected device half, or not. For example, at one frequency the connector may choke ground current flow between the device halves, while freely conducting ground current flow at a second frequency. As a result, antenna performance is optimized and receiver degradation is minimized.

Accordingly, an electrical connector is provided with a frequency-tuned groundplane. The connector comprises a signal medium having a first signal end to accept an electrical signal and a second signal end to supply the electrical signal, and a frequency-tuned groundplane medium. The groundplane medium is adjacent the signal medium and has a first groundplane end to accept a reference voltage, defined with respect to the electrical signal, and a second groundplane end to supply the reference voltage. For example, the reference voltage can be a ground. The groundplane medium differentially supplies the reference voltage to the groundplane second end, responsive to the frequency of the electrical signal.

Typically, the signal medium includes at least one signal layer of a flexible dielectric material with a conductive trace. Then, the groundplane medium includes a first layer of flexible dielectric material with a conductive trace overlying the signal layer, and a second layer of flexible dielectric material with a conductive trace, in electrical communication with the first groundplane layer conductive trace, underlying the signal layer.

More specifically, the first groundplane layer conductive trace may comprise a transmission line pattern, and the second groundplane layer conductive trace may be connected to the first groundplane layer conductive trace through a plurality of conductive vias. For example, the first groundplane layer may include a plurality of conductive patches, some of which have a via connection to the second groundplane layer conductive trace.

In one aspect, the second groundplane layer conductive trace comprises a transmission line pattern. Alternately, the second groundplane layer is a substantially uniform conductive trace. In another variation, the transmission line characteristics of the ground alternate between the first and second groundplane layers. For example, in one portion of the connector a second groundplane layer conductive trace, formed as a transmission line, may overlie a substantially uniform (frequency insensitive) region of first groundplane layer conductive trace. Then, in an adjacent portion of the connector the first groundplane layer conductive trace, formed as a transmission line, may overlie a substantially uniform region of second groundplane layer conductive trace. In this manner, the transmission line pattern alternates between groundplane layers.

Additional details of the above-described connector, and a method for conducting ground current in an electrical connector, responsive to frequency, are provided below.

BRIEF DESCRIPTION OF THE DRAWINGS

FIGS. 2E and 2F are plan views of first and second alternate aspects of the groundplane first layer.

FIG. 3 is a plan view of a third variation of the first groundplane layer trace.

DETAILED DESCRIPTION

Figure 1:
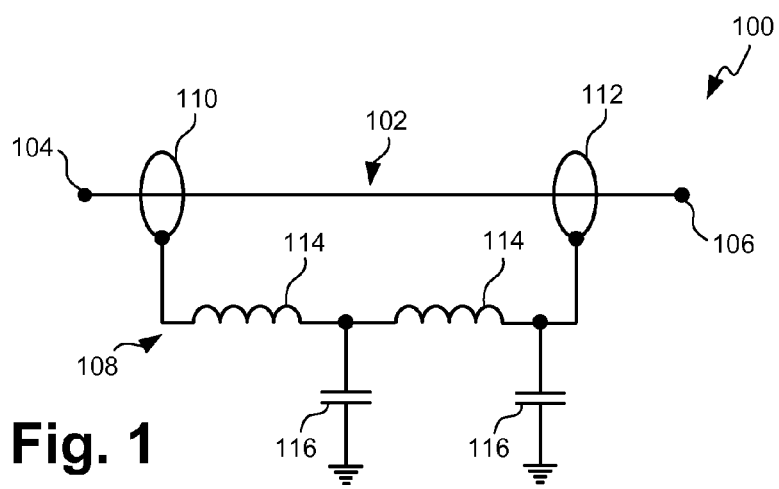
FIG. 1 is a schematic drawing of an electrical connector with a frequency-tuned groundplane.

FIG. 1 is a schematic drawing of an electrical connector with a frequency-tuned groundplane. The connector 100 comprises a signal medium 102 having a first signal end 104 to accept an electrical signal and a second signal end 106 to supply the electrical signal. A groundplane medium 108 with a transmission line pattern is adjacent the signal medium 102. The groundplane medium 108 has a first groundplane end 110 to accept a reference voltage, defined with respect to the electrical signal on line 102, and a second groundplane end 112 to supply the reference voltage. The reference voltage can be signal ground, chassis ground, a DC voltage, or an AC ground, for example. The transmission line pattern is represented, in its simplest form, as series-connected inductive elements 114 that are shunted to ground through capacitors 116. The groundplane medium 108 may be understood to be a transmission line that differentially supplies the reference voltage to the second end 112, responsive to the frequency of the electrical signal. Alternately stated, the inductive elements 114 and capacitive elements 116 can be tuned to a maximum series impedance (or minimum shunt impedance) at an intended frequency. Other, more complex, transmission line schematic representations (not shown) are also suitable for use with the present invention. The frequency-tuned groundplane can be enabled using a more complex type of transmission line.

Figure 2A:
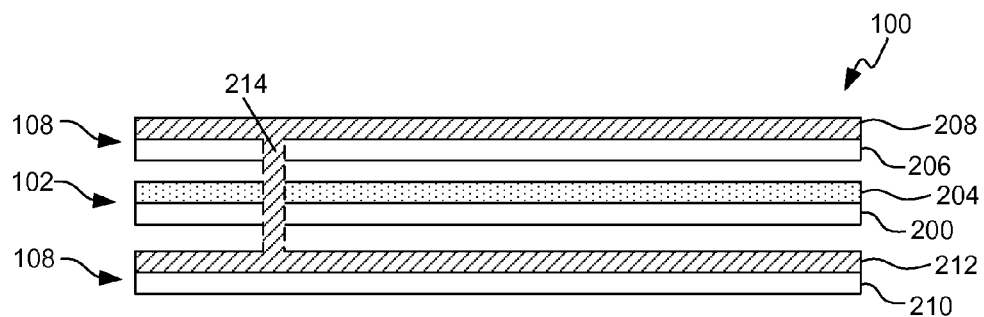
FIG. 2A is a partial cross-sectional view of an electrical connector with a frequency-tuned groundplane.

FIG. 2A is a partial cross-sectional view of an electrical connector with a frequency-tuned groundplane. As in the schematic of FIG. 1, the connector 100 comprises a signal medium 102 and a frequency-tuned groundplane medium 108. For clarity, each layer is separated from adjoining layers by a space that would not exist in a completely assembled connector. In its simplest form, the signal medium 102 includes a single signal layer 200 of a flexible dielectric material with a conductive trace 204. The flexible dielectric material may be a material such as an insulating film or paper. For example, the material can be a polyester or polyimide film, such as Mylar® or Kapton®. Other material choices include a synthetic aromatic polyamide polymer, such as Nomex®. Further, phenolic sheets or polytetrafluoroethylene (PTFE), such as Teflon®, may be used. Chlorosulfonated polyethylene (i.e., Hypalon®), silicon sheets, ethylene propylene diene monomer (EPDM) are also good material choices. However, the dielectric is not limited to any particular material. A number of other conventional materials could be used to enable the invention. The conductive trace may be a material such as copper, silver, conductive ink, tin, or any conventional printed circuit conductor. However, the connector 100 is not limited to any particular materials. The groundplane layers are made from similar flexible materials and conductors.

The groundplane medium 108 includes a first groundplane layer of flexible dielectric material 206 with a conductive trace 208, overlying the signal layer 102. A second groundplane layer of flexible dielectric material 210 with a conductive trace 212, is in electrical communication with the first groundplane layer conductive trace 208. The groundplane second layer 210 underlies the signal layer 200. As described below, the electrical communication between groundplane layers can be accomplished using interlevel via connections or rivets. In other aspects of the connector, the connection between layers can be accomplished using strips or ribbons of conductive materials wrapped around the edges (sides) of the connector.

Figures 2B, 2C, 2D:
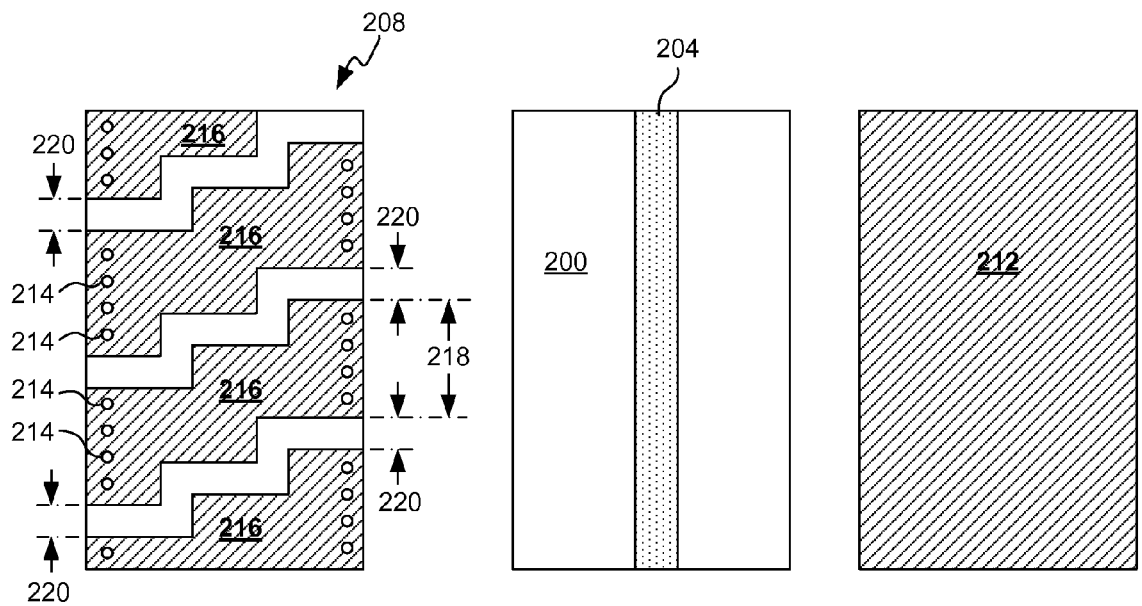
FIGS. 2B, 2C, and 2D are plan views of the groundplane first layer, signal layer, and groundplane second layer, respectively.

FIGS. 2B, 2C, and 2D are plan views of the groundplane first layer, signal layer, and groundplane second layer, respectively. Although only a single conductive trace 204 is shown in FIG. 2B, the connector is not limited to any particular number of signal traces per layer. In other aspects not shown, a plurality of signals layers, each with at least one signal trace, may be formed between the first and second groundplane layers. In the case of multiple signal layers, auxiliary groundplane layers may be formed between signal layers.

In one aspect, the first groundplane layer conductive trace 208 comprises a transmission line pattern, and the second groundplane layer conductive trace 212 is connected to the first groundplane layer conductive trace through a plurality of conductive vias 214. In some aspects, the size, placement, and spacing between vias 214 is part of the transmission line pattern. As shown, the first groundplane layer conductive trace 208 may include a plurality of conductive patches 216, each having a via connection 214 to the second groundplane layer conductive trace 212, which is depicted in cross-hatch as a substantially uniform layer of conductive material. That is, the second groundplane layer trace 212 is not intended to be a transmission line or to have a frequency-responsive impedance. However, the connector is not necessarily limited to such a second groundplane trace. In other aspects, the second groundplane layer trace may also be formed as a transmission line, either independent or in cooperation with the first groundplane layer trace 208.

Each patch 216 has an inductance associated with its length 218. The groundplane layer conductive trace 208 then comprises the plurality of patches 216, placed consecutively lengthwise, capacitively coupled by a first spacing 220. Although the first spacing 220 is shown as having a stepped pattern shape, or patterns are also useful.

FIGS. 2E and 2F are plan views of first and second alternate aspects of the groundplane first layer. Straight line (FIG. 2E) and saw-toothed patterns (FIG. 2F) are shown. The connector is not limited to any particular spacing pattern, or combination of spacing patterns.

Although each signal and groundplane layer has been shown as being comprised of an independent dielectric insulator with an overlying conductive trace, the trace is not limited to placement on any particular surface of the insulator. In other aspects not shown, conductive traces can be formed on opposite sides of a common insulator layer. In a different aspect, conductive trace can be formed underlying insulator layers to preserve electrical integrity.

FIG. 3 is a plan view of a third variation of the first groundplane layer trace. Patches 300 are connected to the second groundplane layer trace (not shown) through a via 214. Although only a single via is shown for each patch 300, in other aspects not shown, each patch may be connected with multiple vias. In some aspects, the size, placement, and spacing between vias 214 are part of the transmission line pattern. Patches 302 are capacitively coupled to the second groundplane layer conductive trace through one (or more) of the patches 300. That is, patches 302 are capacitively coupled to patches 300.

Each patch 300 has a width 304 and a length 306. Each patch 302 has a length 310, and an inductance associated with its width 308. The first groundplane layer 206 has a first edge 312 and a second edge 314. Patches 300 are placed consecutively lengthwise along each edge 312/314 of the layer 206, capacitively coupled by a third spacing 316. Patches 302 are placed consecutively lengthwise, capacitively coupling the inductance of each patch 302 with a fourth spacing 318. Patches 302 are separated widthwise from the patches 300 at each edge 312/314, capacitively coupled by a fifth spacing 320. The second groundplane layer trace (not shown) may be formed into a transmission line pattern, or as a substantially uniform (frequency-insensitive) layer of conductor (see FIG. 2D).

Figure 4:
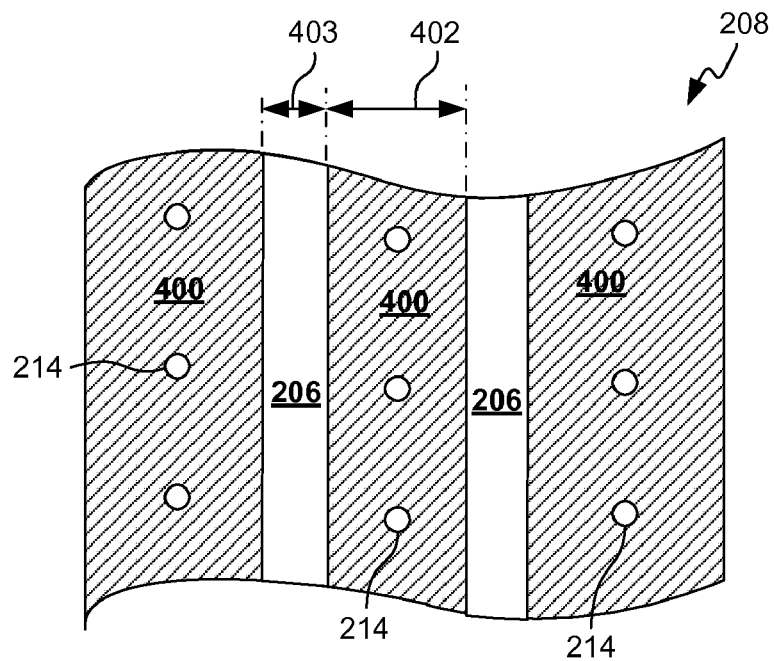
FIG. 4 is a plan view of a fourth variation of the first groundplane layer trace.

FIG. 4 is a plan view of a fourth variation of the first groundplane layer trace. The first groundplane layer conductive trace 208 includes a plurality of patches 400. Each patch 400 has a width 402 and a via connection 214 to the second groundplane conductive trace (not shown). As depicted, each patch 400 is connected to the second groundplane layer trace with a plurality of vias 214 separated at regular intervals. In some aspects, the size, placement, and spacing between vias 214 are part of the transmission line pattern. The patches 400 are placed consecutively widthwise, capacitively coupled by a second spacing 403. Although only three patches are shown in this variation, the invention is not limited to any particular number of lengthwise patches 400.

Figure 5:
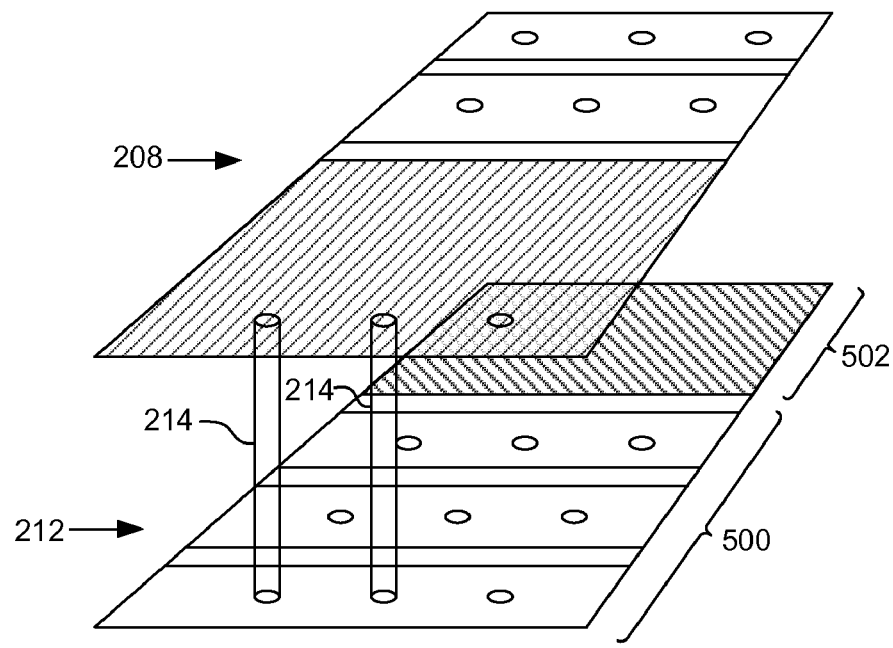
FIG. 5 is a perspective view of a fifth variation of the first groundplane layer trace, with a transmission line pattern second groundplane layer trace.

FIG. 5 is a perspective view of a fifth variation of the first groundplane layer trace, with a transmission line pattern second groundplane layer trace. Note, for clarity, the intervening signal medium layer is not shown. Here, the transmission line pattern alternates between the first and second groundplane layer traces. In a first section 500, a transmission line pattern second groundplane layer conductive trace 212 underlies a substantially uniform (non-frequency dependent) region of first groundplane layer conductive trace 208 shown in cross-hatch. In a second region 502, a transmission line pattern first groundplane layer conductive trace 208 overlies a substantially uniform region of second groundplane layer conductive trace 212 shown in cross-hatch. In other aspects not shown, both the first and second groundplane layer conductive traces may be formed as transmission lines, or there may be an overlap in transmission line patterns between layers (regions 500 and 502 overlap). As above, the two groundplane layers are connected with vias 214 (for clarity only two vias are shown).

Figure 6:
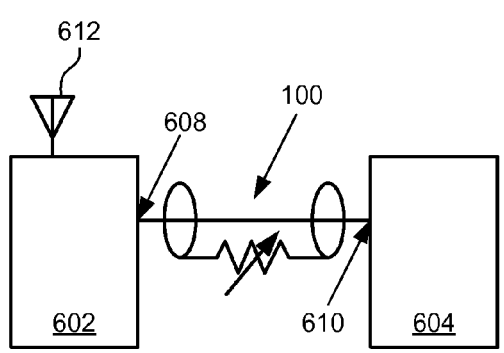
FIG. 6 is a schematic block diagram of a segmented wireless communications device with a frequency-tuned connector groundplane.

FIG. 6 is a schematic block diagram of a segmented wireless communications device with a frequency-tuned connector groundplane. A flip or clamshell phone is an example of a segmented device. The device 600 comprises a first device segment 602 with electrical circuitry, and a second device segment 604 with electrical circuitry. An electrical connector 100 has a first connector end 608 connected to the first device segment 602, and a second connector end 610 connected to the second device segment 604. As generally described in FIGS. 2A through 5, the electrical connector 100 comprises a signal layer of flexible dielectric material with a conductive signal trace, a first groundplane layer, and a second groundplane layer. The first groundplane layer includes a flexible dielectric material with a conductive trace, formed in a transmission line pattern, overlying the signal layer. The second groundplane layer includes a flexible dielectric material with a conductive trace, in electrical communication with the first groundplane layer conductive trace, underlying the signal layer. Details of the connector have been presented above, and will not be repeated in the interest of brevity.

In one aspect, the first device segment 602 includes an antenna 612 operating at a first frequency. The connector 100 minimally conducts ground current at the first frequency.

For the purposes of illustration it has generally been assumed that the above-described antennas have been designed to operate with only one device half. For example, with respect to FIG. 6 it has been assumed that the antenna 612 preferably operates at the first frequency in association with the groundplane of the first segment 602, but not the second segment 604. However, at a second frequency the antenna may preferably operate in association of groundplanes of both the first and second device segments. In this case the flex connector 100 would be designed to conduct second frequency ground current between the first segment 602 and the second segment 604.

Alternately, the first segment 602 may have a second antenna (not shown), which is designed to operate in association with the groundplanes of both the first and second segments. In this circumstance, the connector may act to minimize ground currents responsive to the first antenna, while maximizing ground current flow responsive to the second antenna.

In another variation not shown, each device segment may have an antenna. Assuming that the two antennas are not operating at the same frequency, the connector may be tuned to minimize ground current flow responsive to the antenna 612 on first segment 602, while maximizing ground current flow associated with the second antenna on the second segment.

Alternately considered, FIG. 6 may represent a communications device 600 with a frequency-selectable antenna counterpoise. The device 600 comprises an antenna 612, and a first counterpoise 602 to supply a constant (frequency-insensitive) antenna ground. For example, the antenna can be a style that is sensitive to groundplane placement, such as a PIFA, monopole, or patch antenna. An electrical connector 100 has a first connector end 608 connected to the first counterpoise 602, and a second connector end 610. As explained in detail above, the electrical connector has a groundplane that differentially conducts current responsive to frequency. A second counterpoise 604 is connected to the electrical connector second end 610 to supply an antenna ground through the electrical connector 100, responsive to antenna radiation frequency.

As explained above, such a design is useful in eliminating the influence of the second counterpoise 604. When no ground current flows through the connector 100, the second counterpoise 604 has no effect upon the antenna 612. Alternately, the connector 100 can be used to change antenna patterns. For example, at a first frequency the antenna can have a first pattern as a result (exclusively) of the first counterpoise 602, if the connector conducts no ground current at the first frequency. At a second frequency, the antenna 612 can have a different, intended pattern as a result of the using both the first and second counterpoises. That is, the second pattern is a result of conducting ground current through the connector 100. Other patterns can be created as a result of controlling the amount of ground current being conducted through the connector.

Figure 8:
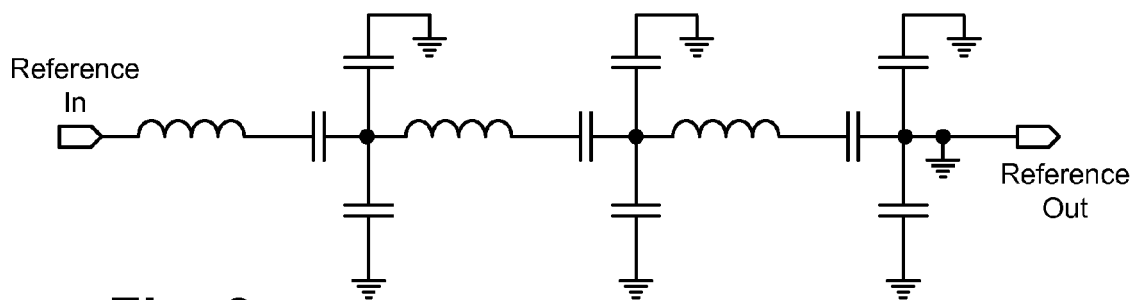
FIG. 8 is a schematic diagram depicting the first groundplane conductive trace of FIG. 3.

FIG. 8 is a schematic diagram depicting the first groundplane conductive trace of FIG. 3. The groundplane acts as a type of low pass filter, creating high impedance paths for the input reference voltage at some frequencies, and low impedances at other frequencies. As can be appreciated by one of skill in the art having the benefit of the present disclosure, low pass, high pass, bandpass pass, and other conventional filter designs can be realized by appropriately arranging the size, placement, distance between elements, inductance, and signal path of the groundplane.

Figure 7:
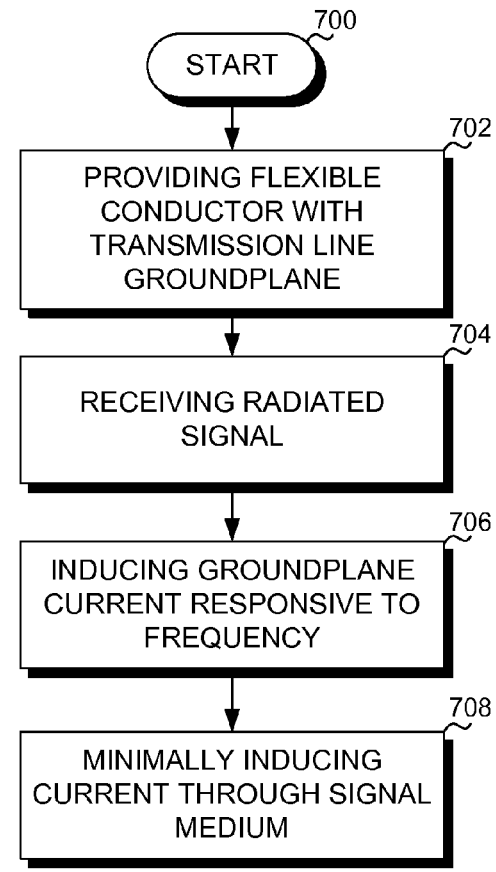
FIG. 7 is a flowchart illustrating a method for conducting ground current in an electrical connector, responsive to frequency.

FIG. 7 is a flowchart illustrating a method for conducting ground current in an electrical connector, responsive to frequency. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 700.

Step 702 provides a flexible conductor comprising a signal medium and a groundplane medium with a transmission line pattern (See FIGS. 2A through 2D). Step 704 receives a radiated electro-magnetic signal. Step 706 induces current through the groundplane medium responsive to the frequency of the radiated signal. In one aspect, receiving the radiated signal in Step 704 includes receiving a signal radiated at a first frequency. Then, inducing current through the groundplane medium in Step 706 includes minimally inducing current through the groundplane medium at the first frequency.

In another aspect, Step 702 connects segments of a wireless communications device via the connector, and Step 704 receives a signal radiated from (or received by) one of the device segments. Then, Step 708 minimally induces current through the signal medium at the first frequency. In a different aspect, Step 704 receives a signal at a second frequency. Then, Step 708 induces a first current through the groundplane medium at the first frequency, while inducing a second current through the groundplane medium at the second frequency, greater than the first current. Note that the first and second currents are not necessarily induced simultaneously.

A flexible connector with a frequency-tuned groundplane has been presented. Examples of particular layers, layer orders, and transmission line patterns have been provided to illustrate the invention. However, the invention is not limited to merely these examples. Other variations and embodiments of the invention will occur to those skilled in the art having the benefit of the present disclosure.

What is claimed is:

1. An electrical connector comprising:
    a signal medium to convey an electrical signal; and
    a groundplane medium adjacent the signal medium and having a first groundplane end connected to a ground in a first device segment of a wireless communication device and having a second groundplane end connected to a ground of a second device segment of the wireless communication device movable relative to the first device segment of the wireless communication device, the groundplane medium configured to have a first groundplane medium impedance between the first groundplane end and the second groundplane end at a first frequency and a second groundplane medium impedance between the first groundplane end and the second groundplane end at a second frequency.

2. The electrical connector of claim 1, wherein the groundplane medium is configured to conduct more ground current through the groundplane medium at the first frequency than at the second frequency.

3. The electrical connector of claim 1 wherein the signal medium comprises a signal layer of a flexible dielectric material with a conductive trace; and
    wherein the groundplane medium comprises:
        a first groundplane layer of flexible dielectric material with a first layer conductive trace, the first groundplane layer disposed on a first side of the signal layer; and
        a second groundplane layer of flexible dielectric material with a second layer conductive trace in electrical communication with the first layer conductive trace, the second groundplane disposed on a second side of the signal layer opposite the first side.

4. The electrical connector of claim 3, wherein the first layer conductive trace comprises a conductive trace pattern; and
    wherein the second layer conductive trace is connected to the first layer conductive trace through a plurality of conductive vias.

5. The electrical connector of claim 4, wherein the first layer conductive trace comprises a conductive trace pattern;
    wherein the second layer conductive trace is connected to the first layer conductive trace through a plurality of conductive vias; and wherein the first layer conductive trace comprises:
    a first plurality of conductive patches; and
    a second plurality of conductive patches connected to the second layer conductive trace through the plurality of vias, each of the first plurality of conductive patches capacitively coupled to the second groundplane layer conductive trace through at least one of the second plurality of patches.

6. The electrical connector of claim 4, wherein the first layer conductive trace comprises a conductive trace pattern;
    wherein the second layer conductive trace is connected to the first layer conductive trace through a plurality of conductive vias; wherein the first layer conductive trace pattern includes a plurality of patches, each patch having an inductance associated with its length and a via connection to the second layer conductive trace; and
    wherein the first layer conductive trace comprises the plurality of patches, placed consecutively lengthwise, capacitively coupled by a first spacing.

7. The electrical connector of claim 6 wherein the first spacing has a shape selected from the group comprising a straight line, a stepped pattern, and a saw-toothed pattern.

8. The electrical connector of claim 4, wherein the first layer conductive trace comprises a conductive trace pattern;
    wherein the second layer conductive trace is connected to the first layer conductive trace through a plurality of conductive vias; and wherein the first layer conductive trace includes a plurality of patches, each patch having a width and a via connection to the second layer conductive trace; and wherein the first layer conductive trace comprises the plurality of patches, placed consecutively widthwise, capacitively coupled by a second spacing.

9. The electrical connector of claim 1, wherein the first groundplane end is connected to a ground in a first half of a wireless communication device and wherein the second groundplane end is connected to a ground of a second half of the wireless communication device movable relative to the first half of the wireless communication device.

10. The electrical connector of claim 1, wherein the signal medium is connected to an antenna in the second device segment of the wireless communication device.

11. The electrical connector of claim 1, wherein groundplane medium prevents ground current flow between the first device segment and the second device segment of the wireless communication device at the second frequency.

12. A wireless communication device comprising:
a first device segment comprising an antenna;
a second device segment comprising electrical circuitry and movable relative to the first device segment; and
an electrical connector connected to the electrical circuitry and the antenna and comprising:
 a signal medium connected between the electrical circuitry and the antenna and configured to convey an electrical signal between the electrical circuitry and the antenna; and
 a groundplane medium adjacent the signal medium and having a first groundplane end connected to ground of the antenna and having a second groundplane end connected to ground of the electrical circuitry, the groundplane medium configured to have a first groundplane medium impedance between the first groundplane end and the second groundplane end at a first frequency and a second groundplane medium impedance between the first groundplane end and the second groundplane end at a second frequency.

13. The wireless communication device of claim 12, wherein the groundplane medium is configured to conduct more ground current through the groundplane medium at the first frequency than at the second frequency.

14. The wireless communication device of claim 12, wherein the signal medium comprises a signal layer of a flexible dielectric material with a conductive trace; and
wherein the groundplane medium comprises:
 a first groundplane layer of flexible dielectric material with a first layer conductive trace, the first groundplane layer disposed on a first side of the signal layer; and
 a second groundplane layer of flexible dielectric material with a second layer conductive trace in electrical communication with the first layer conductive trace, the second groundplane disposed on a second side of the signal layer opposite the first side.

15. The wireless communication device of claim 14, wherein the first layer conductive trace comprises a conductive trace pattern; and
wherein the second layer conductive trace is connected to the first layer conductive trace through a plurality of conductive vias.

16. The wireless communication device of claim 12, wherein the electrical circuitry comprises a transmitter.

17. The wireless communication device of claim 16, wherein the electrical circuitry comprises a receiver.

* * * * *